(12) United States Patent
King

(10) Patent No.: US 9,275,408 B1
(45) Date of Patent: Mar. 1, 2016

(54) TRANSFERRING OWNERSHIP OF COMPUTING RESOURCES

(71) Applicant: Amazon Technologies, Inc., Seattle, WA (US)

(72) Inventor: Wesley Gavin King, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 343 days.

(21) Appl. No.: 13/750,574

(22) Filed: Jan. 25, 2013

(51) Int. Cl.
*G06Q 30/00* (2012.01)
*G06Q 30/06* (2012.01)
*H04L 29/08* (2006.01)
*H04L 29/06* (2006.01)

(52) U.S. Cl.
CPC ............ *G06Q 30/0619* (2013.01); *H04L 67/32* (2013.01); *H04L 67/42* (2013.01)

(58) Field of Classification Search
CPC ........... G06Q 30/0601–30/0643; G06Q 30/08; G06Q 2220/00; G06Q 2220/10–2220/127; H04L 67/00–67/42; G06F 1/00; G06F 1/16; G06F 3/00; G06F 17/00; G06F 17/10–17/18
See application file for complete search history.

(56) References Cited

U.S. PATENT DOCUMENTS

| 2002/0099618 | A1* | 7/2002 | Stiberman | 705/26 |
| 2002/0184162 | A1* | 12/2002 | Babitski et al. | 705/67 |
| 2005/0256938 | A1* | 11/2005 | Margolin | 709/218 |
| 2010/0251339 | A1* | 9/2010 | McAlister | 726/4 |
| 2012/0016721 | A1* | 1/2012 | Weinman | 705/7.35 |
| 2012/0078757 | A1* | 3/2012 | Woolston | 705/27.2 |
| 2013/0014103 | A1* | 1/2013 | Reuther et al. | 718/1 |
| 2013/0111027 | A1* | 5/2013 | Milojicic et al. | 709/225 |
| 2014/0058871 | A1* | 2/2014 | Marr et al. | 705/26.1 |
| 2014/0059226 | A1* | 2/2014 | Messerli et al. | 709/226 |

OTHER PUBLICATIONS www.sherweb.com. Jan. 17, 2012 [recovered from www.Archive.org].*

* cited by examiner

*Primary Examiner* — William Allen
(74) *Attorney, Agent, or Firm* — Lee & Hayes, PLLC

(57) ABSTRACT

A service provider provides instances of computing resources for customer use, such as instances of data processing resources, data storage resources, database resources, and networking resources. A customer of the service provider might create a solution that utilizes one or more instances of computing resources provided by the service provider. The customer can request to transfer control and payment responsibility for computing resources, such as those utilized in a solution, to another customer of the distributed computing environment. In response to such a request, control and payment responsibility for the resources may be transferred to the receiving customer. The request to transfer resources might be received by way of a solution marketplace or through another mechanism.

20 Claims, 8 Drawing Sheets

TRANSFERRING OWNERSHIP OF COMPUTING RESOURCES

BACKGROUND

Network-based distributed computing environments exist that allow customers to purchase and utilize computing resources, such as virtual machine instances, on a permanent or as-needed basis. In addition to virtual machine instances, these types of services typically allow customers to purchase and utilize other types of computing resources with virtual machine instances. For example, customers might be permitted to purchase access to and use of block data storage services, database services, networking resources, and other types of computing resources. Utilizing these computing resources as building blocks, customers of such a service can create custom "solutions" that provide various types of functionality, such as application hosting, backup and storage, content delivery, World Wide Web ("Web") hosting, enterprise information technology ("IT") solutions, database services, and others. Once a customer of such a network-based service has created a solution, however, it is not currently possible to transfer control and the responsibility to pay for computing resources that provide the solution to another customer of the service.

The disclosure made herein is presented with respect to these and other considerations.

DETAILED DESCRIPTION

Figure 1:
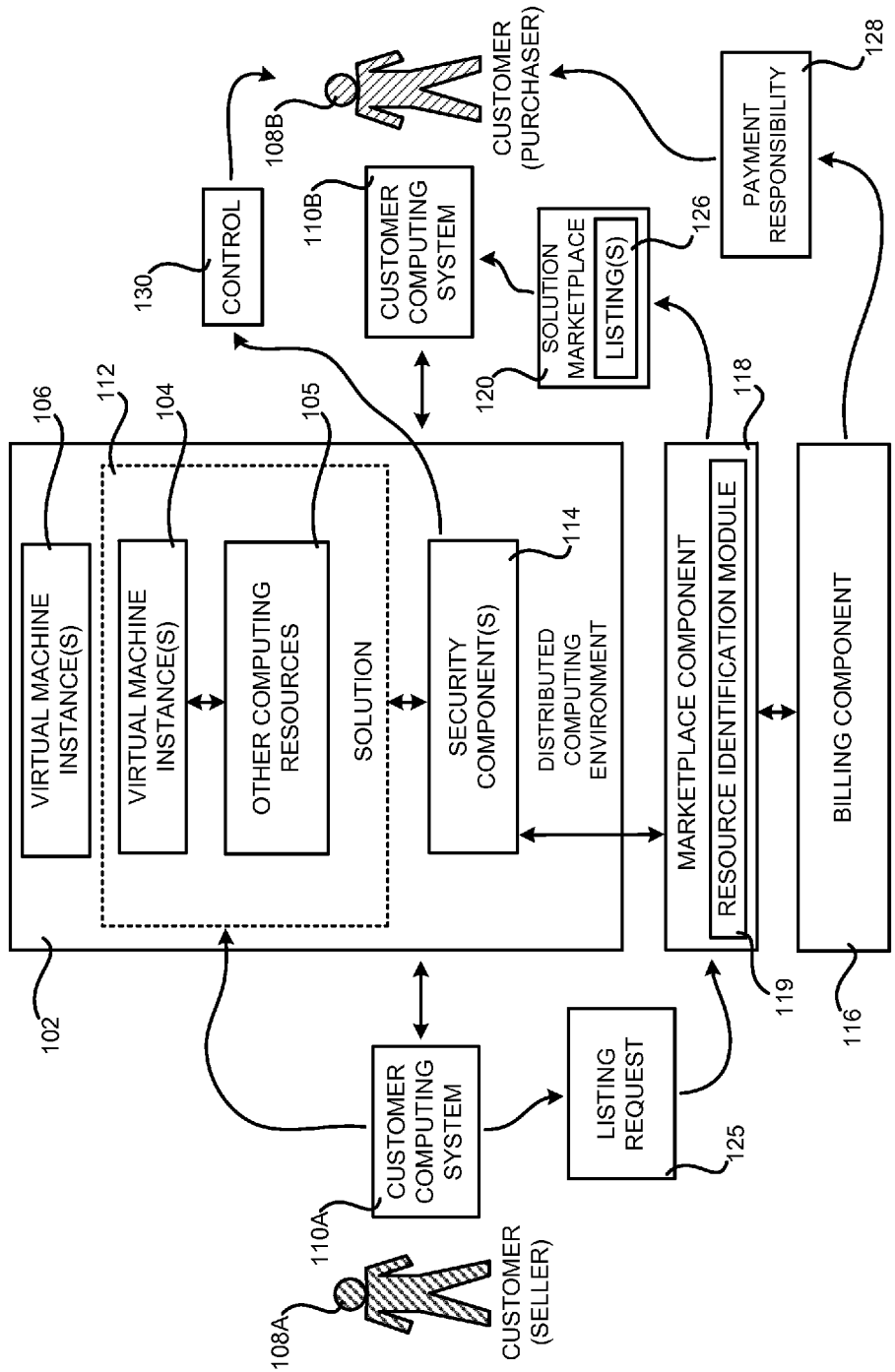
FIG. 1 is a computer system diagram providing an overview description of a mechanism disclosed herein for transferring ownership of computing resources in a distributed computing environment, according to one embodiment presented herein.

The following detailed description is directed to technologies for transferring ownership of instances of computing resources. Utilizing the technologies described herein, a customer of a service provider that offers infrastructure as a service can create a solution that utilizes various computing resources provided by a distributed computing environment. The customer can then transfer control of the solution, including all of the computing resources utilized thereby, to another customer of the service provider. The customer could also transfer control of single or multiple instances or other computing resources that are not a part of a solution. Transferring "control" of computing resources as utilized herein, refers to the transfer of the ability to manage the computing resources and potentially the responsibility for payment of charges associated with execution and/or use of the computing resources in the distributed computing environment.

According to one aspect presented herein, a computer-implemented mechanism is disclosed for transferring control of computing resources. In one implementation, the mechanism operates in conjunction with a plurality of services such as data storage services, database services, and an execution service in which customers can purchase, configure, and utilize computing resources, such as virtual machine instances, data storage resources, networking resources, and database resources, on a permanent or as-needed basis. The execution service may offer computing resources for purchase and use in various configurations. For example, the execution service might offer virtual machine instances available for purchase and use that have many different configurations of processor capabilities, main memory, disk storage, and operating systems. As mentioned above, a customer might create, configure, and deploy various combinations of computing resources to create "solutions" that provide various types of functionality, such as application hosting, backup and storage, content delivery, Web hosting, enterprise IT solutions, database services, and others.

In order to provide the functionality disclosed herein, the execution service, or a component operating in conjunction with the service provider, provides a mechanism through which one customer (who might be referred to herein as a "seller") can initiate the transfer of computing resources to another customer (who might be referred to herein as the "purchaser"). In response to receiving a request from a seller to transfer computing resources to a purchaser, the component is configured to cause control of the computing resources and payment responsibility for the operation and/or use of the computing resources to be transferred from the seller to the purchaser. It should be appreciated that while the terms "seller" and "purchaser" may be used herein, respectively, to describe the transferor and transferee of computing resources, it is not necessary that money or other consideration be received in exchange for a transfer in ownership. Additionally, it should be appreciated that a purchaser might initiate the transfer of computing resources rather than the seller in some implementations.

In order to transfer control of computing resources, the resources can be identified out of the various resources controlled by the seller, in one embodiment. For example, the computing resources, such as machine images that can be launched into a virtual machine, databases, data stored in a data storage service, etc., might be identified as those resources used by a particular solution created by the seller. In this regard, the computing resources to be transferred might be explicitly identified by the seller via a console (e.g., a web-based console or a client console) or one or more application program interface ("API") calls that pass identifiers of the computing resources to the service provider in a programmatic manner. In one implementation, a seller might indicate that a solution (composed of one or more computing resources, such as virtual machine instances) is to be offered for sale. Subsequently, any dependent and/or related resources, such as virtual disk volumes used by virtual machine instances, databases or data storage services, and/or networking resources might also be identified in the manner described above. The computing resources to be transferred might be identified at the time a solution or another type of computing resources is offered for sale, at the time a purchase of a solution or another type of computing resources is initiated, or at another time.

Once the computing resources to be transferred to the purchaser have been identified, the ability to control the operation of the resources is transferred from the seller to the purchaser. In order to transfer control of the computing resources to the purchaser, various security mechanisms that govern access and control of the computing resources might be accessed and/or modified. For example, and without limitation, one or more security groups associated with the computing resources to be transferred might be modified, one or more access control policies associated with the computing resources might be modified, passwords can be reset, and/or a public/private key pair for accessing the computing resources might be changed. Other mechanisms might also be utilized to transfer control of the operation of computing resources from a seller to a purchaser.

In order to transfer payment responsibility for computing resources to a purchaser, a billing system might be instructed to modify its records to indicate that the purchaser, rather than the seller, is responsible for charges associated with the transferred resources accruing after the transfer date. Following such a modification, the purchaser will assume responsibility for the payment of charges associated with the transferred computing resources. Other operations might also be performed in order to transfer control and payment responsibility for instances of computing resources in a distributed computing environment. For example, after the transfer of control is complete, a billing service may use updated account information to determine that the purchaser is responsible for charges and use this information to charge the correct party.

In some implementations, a solution marketplace is provided through which a seller can list one or more computing resources or an entire solution for sale. The computing resources offered for sale might include computing resources in production, in that they are in use. Alternately, computing resources and/or a solution might be created for sale on the solution marketplace and might not include actual in-production computing resources.

In order to create a new listing on the solution marketplace, a seller might provide information regarding the instances or the solution offered for sale. For example, the seller might provide a description of the solution, a description of the computing resources utilized by the solution, along with metrics regarding the solution, such as the average or estimated cost to operate the solution in the distributed computing environment, the number of requests received and/or processed by the solution, and potentially other types of metrics. The seller might also specify a price for the solution.

If a purchaser requests to purchase computing resources or a solution by way of the solution marketplace, the computing resources included in the sale may be identified in the manner described above. For example, any associated or dependent instances might be identified explicitly by the seller, by monitoring instances explicitly identified as being for sale by the seller, through an API, or in another manner. Control and payment responsibility for the sold instances is also then transferred to the purchaser in the manner described above. Additionally, the seller might be paid a fee for the solution. The provider of the distributed computing environment and/or the solution marketplace might also charge a commission or other type of fee for facilitating the sale of a solution or individual computing resources. Additional details regarding the various components and processes described above for transferring ownership of instances of computing resources in a distributed computing environment will be presented below with regard to FIGS. 1-8.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a computer system diagram providing an overview description of a mechanism disclosed herein for transferring ownership of computing resources, according to one embodiment presented herein. In one embodiment, the mechanism disclosed herein operates in conjunction with a network-based distributed computing environment 102 in which customers, such as the customers 108A and 108B, can purchase and utilize computing resources, such as a virtual machine instance 104 and the computing resources 105, on a permanent or as-needed basis. The distributed computing environment 102 may offer computing resources for purchase in various configurations. For example, the distributed computing environment 102 might offer virtual machine instances 104 available for purchase and use that have many different configurations of processor capabilities, main memory, disk storage, and operating system.

The distributed computing environment 102 might also offer other types of computing resources 105 for purchase and use by customers 108. For example, the distributed computing environment 102 might offer load balancing resources, domain name service resources, data storage resources, networking resources, database resources, and other types of resources on a permanent or as needed basis. The operator of the distributed computing environment 102 may charge a fee for operating the instances 104 and the computing resources 105 to the customer 108 that creates the instances 104 and the computing resources 105. Various pricing models that might be utilized to charge a customer 108 for use of computing resources within the distributed computing environment 102 will be described below with regard to FIG. 4.

As mentioned briefly above, a customer, such as the customer 108A (who might be referred to below as a "seller"), of the distributed computing environment 102 might utilize a customer computing system 110A to purchase, configure, and deploy various instances 104 and other computing resources 105 provided by the distributed computing environment 102. For example, the customer 108A might create, configure, and deploy various combinations of computing resources to create a solution 112 that provides certain functionality. For instance, as mentioned above, the solution 112 might provide functionality for application hosting, backup and/or storage, content delivery, Web hosting, enterprise IT solutions, database services, or others. The solution 112 might also provide other types of functionality. In the example shown in FIG. 1, the solution 112 utilizes one or more virtual machine instances 104 and one or more other computing resources 105. It should be appreciated that the instances 104 and the other computing resources 105 that make up the solution 112 might be configured and deployed within the distributed computing environment 102 in a manner designed to provide the solution 112.

It should also be appreciated that the distributed computing environment 102 might provide other facilities for implementing a solution 112. For instance, the distributed computing environment 102 might provide facilities for automatically scaling the instances 104 and the other computing resources 105 in response to fluctuations in demand, various types of network functionality, such as domain name services ("DNS" services), and other functionality related to the provision of a solution 112. The customer 108A might configure these various aspects of the distributed computing environment 102 appropriately for the operation of their particular solution 112.

It should be appreciated that although a single solution 112 is illustrated in FIG. 1, the customer 108A of the distributed computing environment 102 might maintain many solutions 112 that include many different computing resources. The customer 108A might also maintain other virtual machine instances 106 and other computing resources that are not a part of a solution 112. As will be described in greater detail below, the mechanisms described herein allow the customer 108A to transfer instances 104 and other computing resources 105 in a solution 112 to another customer 108B (who might be referred to herein as the "purchaser") of the distributed computing environment 102. The customer 108A might also be permitted to transfer individual instances 104 and other computing resources 105 that are not a part of a solution 112 to another customer 108B of the distributed computing environment 102. Additional details regarding these processes will be provided below.

In order to enable the transfer of instances 104 and other computing resources 105 from a customer 108A of the distributed computing environment 102 to another customer 108B, the distributed computing environment 102 provides a mechanism through which the customer 108A can initiate a transfer of instances 104 and other computing resources 105. In one implementation, this mechanism is provided by a marketplace component 118. As will be described in greater detail below, the marketplace component 118 is configured to provide a solution marketplace 120 through which a customer 108A can list a solution 112 for sale. The solution marketplace 120 might also allow the customer 108A to list individual instances 104, collections of instances 104, and/or other computing resources 105 that are not a part of a solution 112 for sale. It should be appreciated, however, that other mechanisms might also be provided through which a customer 108A can sell or otherwise transfer instances 104 and other computing resources 105 to another customer 108B of the distributed computing environment 102. The embodiments disclosed herein, therefore, should not be read as being limited to use in connection with a solution marketplace 120. Additionally, as mentioned above, although the terms "seller" and "purchaser" may be used herein, respectively, to describe the transferor and transferee of instances of computing resources, it is not necessary that money or other consideration be received in exchange for a transfer in ownership.

As described briefly above, the marketplace component 118 is configured to provide a solution marketplace 120 through which customers of the distributed computing environment 102 can list solutions 112, individual instances 104, and/or other computing resources 105 for sale to other customers of the distributed computing environment 102. The solution marketplace 120 contains listings 126 of solutions 112, instances 104, and/or other computing resources 105 that have been offered for sale. In this regard, a customer of the distributed computing environment 102, such as the customer 108B, might utilize a customer computing system 110A to view the listings 126 available by way of the solution marketplace 120. As will be described in greater detail below, the customer 108B can then utilize the customer computing system 110B to initiate the purchase of a solution 112, individual instances 104, and/or other computing resources 105. Details regarding this process will be provided below.

In order to create a new listing 126 in the solution marketplace 120 for a solution 112, one or more individual instances 104, or other computing resources 105, the customer 108A may utilize the customer computing system 110A to access the marketplace component 118. In order to generate a listing 126, such as for the solution 112 for example, the customer 108A might provide various information regarding the solution 112. For instance, the customer 108A might submit a listing request 125 that includes a description of the solution 112, a description of the instances 104 and other computing resources 105 included in the solution 112, metrics regarding the solution, such as the cost to operate the solution 112 in the distributed computing environment 102, the number of requests received and/or processed by the solution 112, and potentially other information. The customer 108A might also specify a price for the solution 112 in the listing 126. The customer 108A might also provide similar information when creating a new listing 126 for a single instance 104, multiple instances 104, and/or other computing resources 105 that are not part of a solution 112.

In response to receiving a listing request 125 from the customer 108A, the marketplace component 118 is configured to generate a new listing 126 in the solution marketplace 120. For example, the listing 126 might identify a solution 112 for sale or one or more instances 104 or other computing resources 105 that are not a part of a solution.

A customer 108B desiring to purchase a solution 112 can browse the listings in the solution marketplace 120, including the listing 126. In this way, the customer 108B can view the information specified by the customer 108A regarding the solution 112. The customer 108B might also request to purchase the solution 112, individual instances 104, or other computing resources 105 identified in the listing 126 in the solution marketplace 120.

In response to receiving a request from a customer 108B to purchase a solution 112, an individual instance 104, or other computing resources 105, the marketplace component 118 is configured in one embodiment to perform various functions to transfer ownership of the purchased solution 112 or other computing resources 105 from the customer 108A to the customer 108B. As mentioned above, transferring ownership of a solution 112 or other computing resources 105 refers to the transfer of control of the solution 112 or other computing resources 105 and responsibility for payment of charges associated with the execution and/or use of the solution 112 or other computing resources 105 in the distributed computing environment 102.

Prior to transferring control 130 and payment responsibility 128 to the purchaser 108B, the marketplace component 118 is configured in one implementation to identify all of the computing resources that are associated with an instance 104 or solution 112 that is to be transferred. In order to identify associated computing resources, the marketplace component 118, or another component, might utilize various mechanisms.

For example, in one implementation, the seller 108A might be requested to explicitly identify all of the computing resources, such as instances 104 or other computing resources 105, which are associated with the solution 112 or another instance 104 that is to be transferred to the customer 108B. An appropriate user interface or other mechanism might be exposed to the seller 108A through which the seller can explicitly identify all of the computing resources to be transferred. For example, if the seller 108A indicates that a virtual machine instance is to be transferred, an appropriate user interface might be provided to the customer 108A through which the customer can identify other computing resources, such as data storage resources, which are associated with the virtual machine instances 104 that are to be transferred. Other appropriate user interfaces might also be provided.

In another implementation, the distributed computing environment 102 is configured to identify associated computing resources through monitoring of the operation of the computing resources. For example, the distributed computing environment 102 might monitor the operation of a virtual machine instance 104 to identify other computing resources associated therewith from logs. For example, the computer system hosting the virtual machine instance 104 can generate logs indicating the instance identifier ("ID"), the time, the Internet Protocol ("IP") address of the virtual machine, the user account associated with the virtual machine, etc. In addition, each service can generate logs that indicate the IP address of a requestor, the user account associated with the request, the time, the credentials used for the request, etc. A resource identification module 119 can then compare the logs to patterns that reflect relationships between computing resources to determine whether a resource should be included in a solution 112.

As an example, the other computing resource 105 may be a data storage resource. If the virtual machine instance 104 accesses the data storage resource 105, then the data storage resource, or at least the data accessed by the virtual machine instance 104 will be considered to be associated with the virtual machine instance 104. Other types of monitoring of instances 104 and other computing resources 105 might also be performed in order to identify related, dependent, or otherwise associated computing resources that should be sold together. For example, access control policies on certain resources might specify identifiers of virtual machine instances 104 that can access the data and identifiers associated with the account of the seller 108A, and the resource identification module 119 can use this information to detect computing resources that are associated with the virtual machine instances 104.

In the same or another embodiment, the resource identification module 119 can use tags specified by the seller 108A to determine whether computing resources should be associated with a solution 112. For example, the seller 108A can tag (e.g., associate metadata) a computing resource with an arbitrary key/value pair to keep track of what resources are associated with a solution 112 (e.g., project=solution, or color=purple). The resource identification module 119 can scan the metadata and group any computing resources tagged with the same key/value pair as part of a solution 112.

In some implementations, the distributed computing environment 102 is also configured to provide an API that can be called with an identifier for a particular instance 104. In response, the API will return the identities of all instances and other computing resources that are associated with the identified instance 104. In this way, the distributed computing environment 102 can provide a convenient mechanism through which all related, dependent, or otherwise associated computing resources can be identified. Additional details regarding the various processes utilized herein to identify associated instances 104 and other computing resources 105 will be provided below.

Once all of the instances 104 and/or other computing resources 105 to be transferred from the seller 108A to the purchaser 108B have been identified, the marketplace component 118 operates in conjunction with other components within, and potentially external to, the distributed computing environment 102 to transfer control 130 and payment responsibility 128 for the instances 104 and/or other computing resources 105. For example, in order to transfer control 130 of the instances 104 to the purchaser 108B, the marketplace component 118 might interface with one or more security components 114 executing within the distributed computing environment 102.

The security components 114 provide various mechanisms that allow only authorized users to access and control instances 104 and/or other computing resources 105 within the distributed computing environment 102. In this regard, for example, the marketplace component 118 might cause the security components 114 to modify one or more security groups associated with the instances 104 and/or other computing resources 105 to be transferred to remove the ability to control the instances 104 and/or computing resources 105 from the seller 108A and to permit the customer 108B to control the transferred instances 104 and/or other computing resources 105. A security group controls the traffic allowed into one or more instances.

In other embodiments, the marketplace component 118 might interact with the security components 114 to cause one or more access control policies to be modified to permit the customer 108B to control the instances 104 and/or other computing resources 105 transferred from the customer 108A. In other implementations, the marketplace component 118 might interact with the security components 114 to cause a public/private key pair to be provided to the customer 108B that is utilized to access the instances 104 and/or other computing resources 105 to be generated and provided to the purchaser 108B or transferred from the customer 108A to the purchaser 108B.

It should be appreciated that the various mechanisms described above for controlling access to the instances 104 and/or other computing resources 105 are merely illustrative and that other actions may be taken in order to transfer control 130 from a seller 108A to a purchaser 108B. In this regard, the marketplace component 118 might interact with other components executing in the distributed computing environment 102 that impose access restrictions on the instances 104 and/or other computing resources 105 that exist therein.

In order to transfer payment responsibility 128 to the purchaser 108B, the marketplace component 118 interacts with a billing component 116 in one implementation. The billing component 116 maintains records identifying the customer 108 that has payment responsibility for instances 104 and/or other computing resources 105 created within the distributed computing environment 102.

In order to transfer payment responsibility 128 from the seller 108A to the purchaser 108B for the instances 104 and other computing resources 105 in a solution 112, for example, the marketplace component 118 interacts with the billing component 116. In particular, the marketplace component 118 might instruct the billing component 116 to make the purchaser 108B responsible for payment for instances 104 and the other computing resources 105 transferred from the seller 108A.

In this way, the purchaser 108B can assume payment responsibility 128 for any instances 104 and/or other computing resources 105 purchased as part of solutions 112 through the solution marketplace 120 or otherwise transferred from another customer 108A of the distributed computing environment 102. It should be appreciated that, in some implementations, the instances 104 and/or other computing resources 105 transferred from a customer 108A to a customer 108B are in use serving actual client requests. In this regard, it should be appreciated that the instances 104 and/or other computing resources 105 may be transferred from a customer 108A to a customer 108B without experiencing any down time or other type of interruption of service of the instances 104. In this way, a customer 108A of a solution 112 that has experienced commercial success may sell or otherwise transfer the solution 112 to a customer 108B without interrupting service for customers of the solution 112. In other implementations, however, the instances 104 and/or other computing resources 105 transferred from a customer 108A to a customer 108B might not be utilized to serve actual customer requests. For example, a customer 108A might create a solution 112 and transfer the solution 112 to a customer 108B. The customer 108B might then decide whether to place the solution 112 into service in a production environment. Other scenarios should be apparent to those skilled in the art. Additional details regarding the various components and processes described above for transferring ownership of computing resources will be presented below with regard to FIGS. 2-8.

Figure 2:
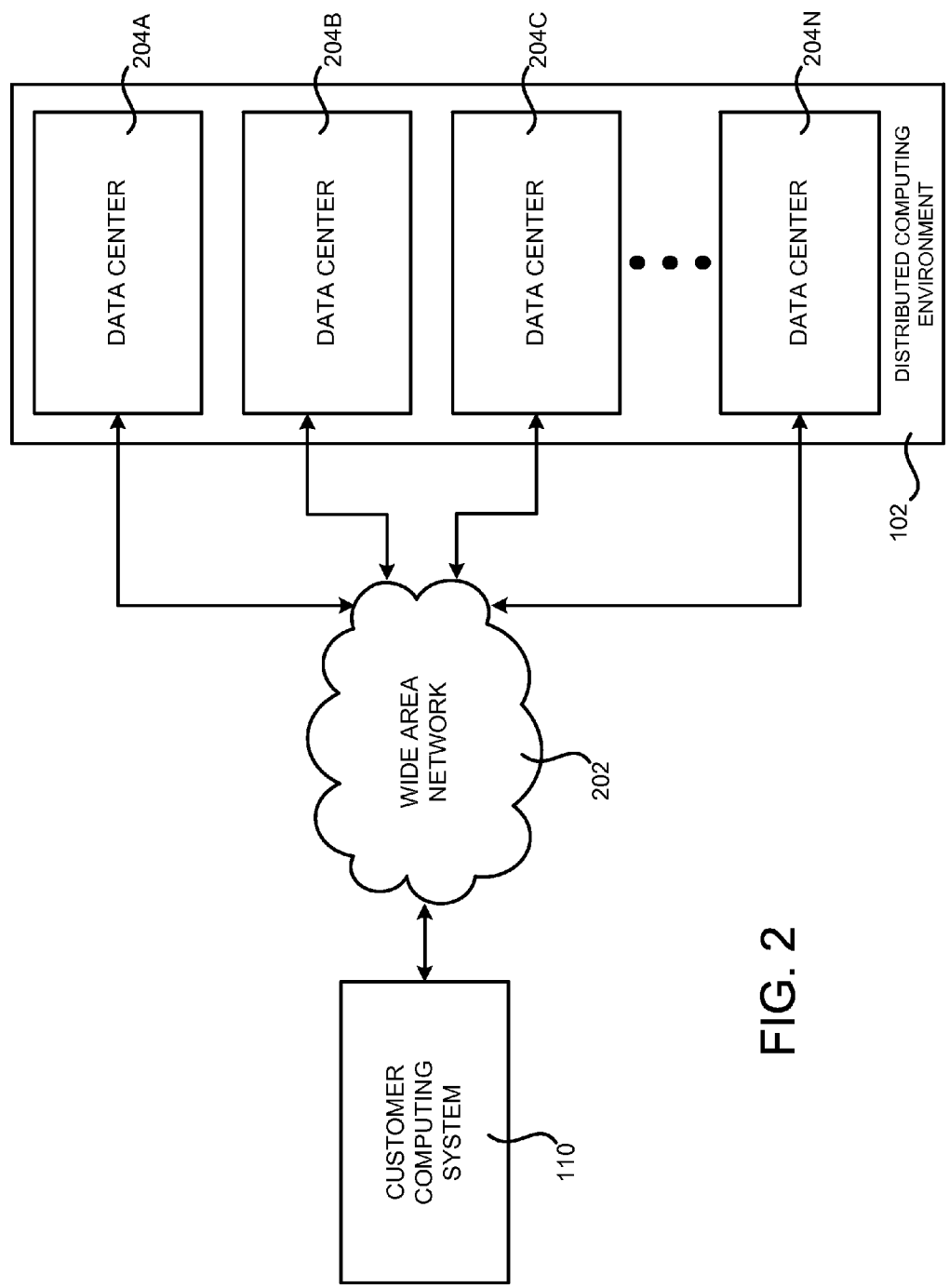
FIG. 2 is a system and network diagram that shows one illustrative operating environment for the embodiments disclosed herein that includes a distributed computing environment configured to provide functionality for transferring ownership of computing resources.

FIG. 2 and the following description are intended to provide a brief, general description of a suitable computing environment in which the embodiments described herein may be implemented. In particular, FIG. 2 is a system and network diagram that shows an illustrative operating environment that includes a distributed computing environment 102 capable of transferring ownership of computing resources 104 in the manner disclosed herein.

As discussed briefly above, the distributed computing environment 102 can provide computing resources on a permanent or an as-needed basis. The computing resources provided by the distributed computing environment 102 may include various types of resources, such as data processing resources, data storage resources, networking resources, data communication resources, and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers, and other types of applications. Data storage resources may include file storage devices, block storage devices, and the like.

Each type or configuration of a computing resource may be available in different sizes, such as large resources, consisting of many processors, large amounts of memory, and/or large storage capacity, and small resources consisting of fewer processors, smaller amounts of memory, and/or smaller storage capacity. Additional details regarding the various types of computing resources offered by the distributed computing environment 102 will be provided below with regard to FIG. 4.

The computing resources provided by the distributed computing environment 102 are enabled in one implementation by one or more data centers 204A-204N (which may be referred herein singularly as "a data center 204" or in the plural as "the data centers 204"). The data centers 204 are facilities utilized to house and operate computer systems and associated components. The data centers 204 typically include redundant and backup power, communications, cooling, and security systems. The data centers 204 might also be located in geographically disparate locations. One illustrative configuration for a data center 204 that implements the concepts and technologies disclosed herein transferring ownership of computing resources will be described below with regard to FIG. 3.

The customers 108 and other consumers of the distributed computing environment 102 may access the computing resources provided by the data centers 204 over a WAN 202. Although a WAN 202 is illustrated in FIG. 2, it should be appreciated that a local-area network ("LAN"), the Internet, or any other networking topology known in the art that connects the data centers 204 to remote customers 108 and other users may be utilized. It should also be appreciated that combinations of such networks might also be utilized.

Figure 3:
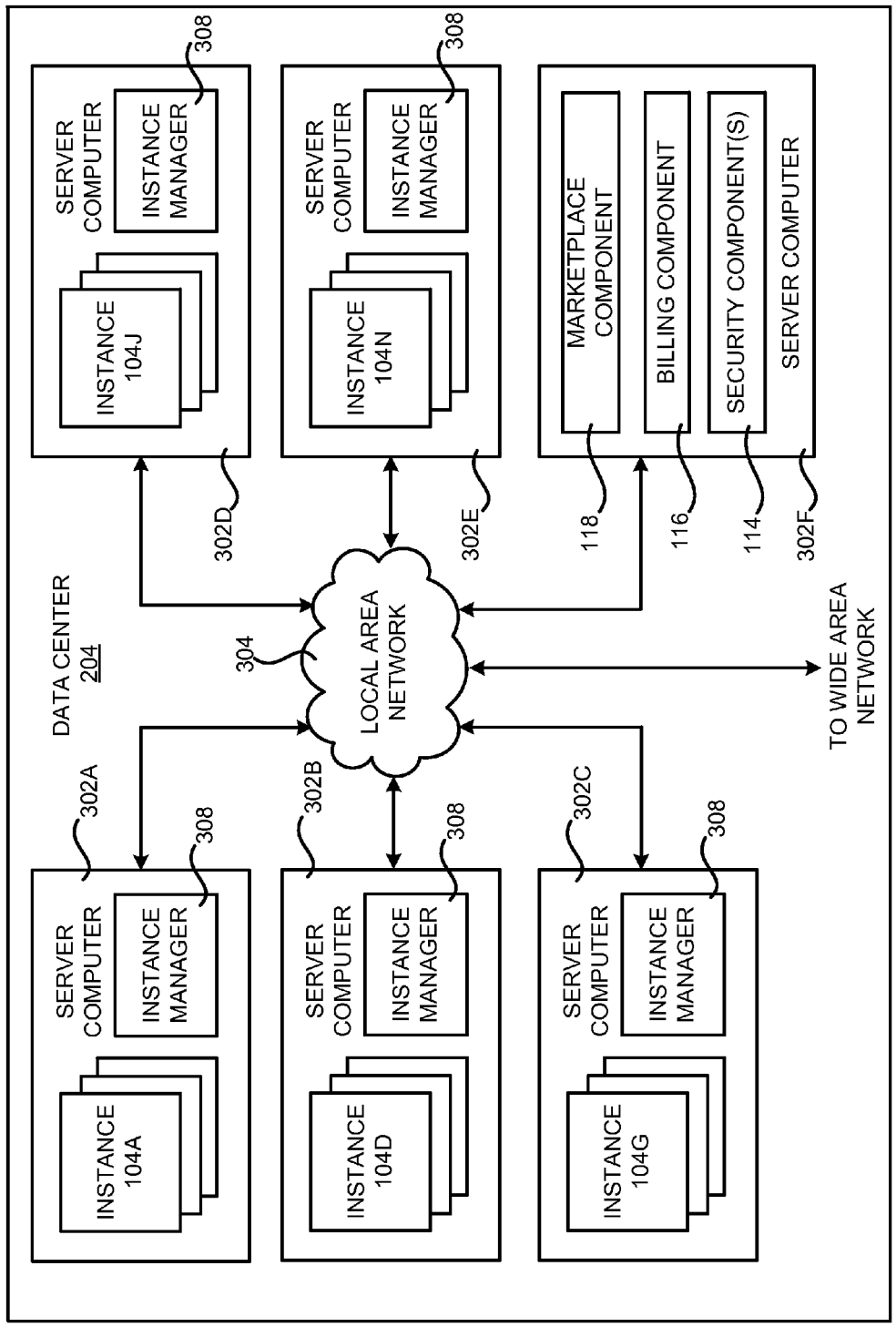
FIG. 3 is a computing system diagram that illustrates one configuration for a data center that implements aspects of the concepts and technologies disclosed herein for transferring ownership of computing resources in a distributed computing environment, according to one embodiment disclosed herein.

FIG. 3 is a computing system diagram that illustrates one configuration for a data center 204 that implements a distributed computing environment 102, including the concepts and technologies disclosed herein for transferring ownership of computing resources. The example data center 204 shown in FIG. 3 includes several server computers 302A-302F (which may be referred to herein singularly as "a server computer 302" or in the plural as "the server computers 302") for providing computing resources. The server computers 302 may be standard tower or rack-mount server computers configured appropriately for providing the computing resources described herein. For example, in one implementation the server computers 302 are configured to provide virtual machine instances 104A-104N (which may be referred to herein singularly as "an instance 104" or in the plural as "the instances 104"). The server computers 302 might also be configured to provide other computing resources 105, such as data storage resources, networking resources, and others.

As known in the art, a virtual machine instance 104 is an instance of a software implementation of a machine (i.e. a computer) that executes programs like a physical machine. Each of the servers 302 may be configured to execute an instance manager 308 capable of instantiating and managing virtual machine instances 104 and, potentially, other types of computing resources. In the case of virtual machine instances, for example, the instance manager 308 might be a hypervisor or another type of program configured to enable the execution of multiple virtual machine instances 104 on a single server 302, for example.

It should be appreciated that although the embodiments disclosed herein are described primarily in the context of virtual machine instances, other types of computing resources can be utilized with the concepts and technologies disclosed herein. For example, the technologies disclosed herein might be utilized with hardware resources, data storage resources, data communications resources, networking resources, database resources, and with other types of computing resources.

The data center 204 shown in FIG. 3 also includes a server computer 302F reserved for executing software components for managing the operation of the data center 202, the server computers 302, and the instances 104. In particular, the server computer 302F might execute the marketplace component 118, the billing component 116, and the security components 114. Details regarding the operation of each of these components will be provided below. In this regard, it should be appreciated that while these components are illustrated as executing within the distributed computing environment 102, computing systems that are external to the distributed computing environment 102 might be utilized to execute some or all of these components. Other configurations might also be utilized.

In the example data center 204 shown in FIG. 3, an appropriate LAN 304 is utilized to interconnect the server computers 302A-302E and the server computer 302F. The LAN 304 is also connected to the WAN 202 illustrated in FIG. 2. It should be appreciated that the configuration and network topology illustrated in FIGS. 1-3 has been greatly simplified and that many more computing systems, networks, and networking devices may be utilized to interconnect the various computing systems disclosed herein. Appropriate load balancing devices or software modules might also be utilized for balancing a load between each of the data centers 204A-204N, between each of the server computers 302A-302F in each data center 204, and between instances 104 purchased by each customer of the distributed computing environment 102.

It should be appreciated that the data center 204 described in FIG. 3 is merely illustrative and that other implementations might be utilized. In particular, functionality described herein as being performed by the security components 114, the marketplace component 118, and the billing component 116 might be performed by one another, might be performed by other components, or might be performed by a combination of these or other components. Additionally, it should be appreciated that the functionality provided by these components might be implemented in software, hardware, or a combination of software and hardware. Other implementations should be apparent to those skilled in the art.

Figure 4:
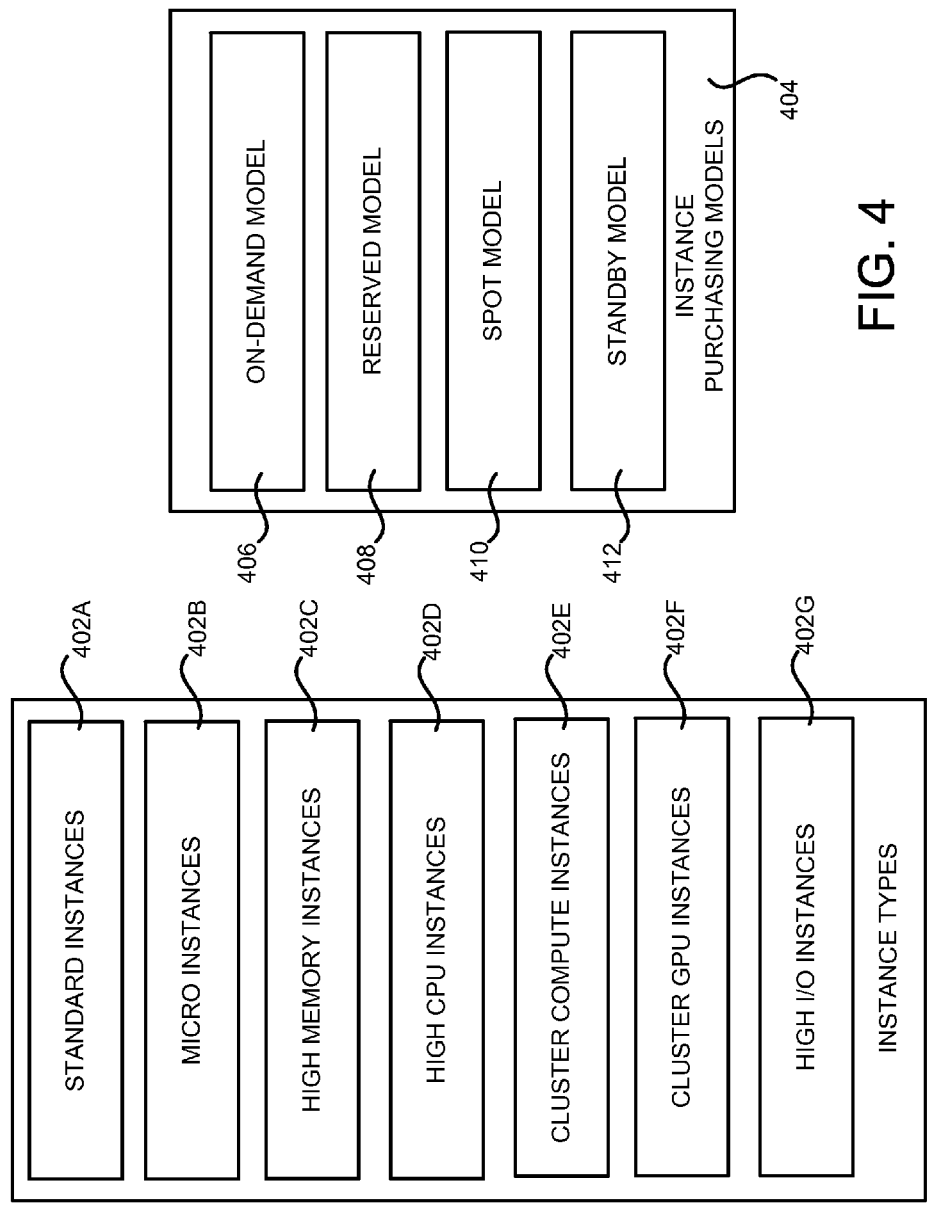
FIG. 4 is a block diagram showing aspects of various instance types and instance purchasing models that might be provided through a distributed computing environment and utilized in embodiments disclosed herein.

FIG. 4 is a block diagram illustrating several types of instances 104, along with several purchasing models that might be utilized to set the price for instances 104, available within the distributed computing environment 102, according to embodiments disclosed herein. As described briefly above, virtual machine instances 104 provided by the distributed computing environment 102, may be made available to customers in a number of different types, or configurations. The example instance types shown in FIG. 4 indicates that the following instance types are available for use within the distributed computing environment 102: standard instances; micro instances; high memory instances; high central processing unit ("CPU") instances; cluster compute instances; cluster graphics processing unit ("GPU") instances, and high input/output ("I/O") instances. Aspects of each of these instance types will be described below.

Standard instances are instances 104 that are configured with generally proportional amounts of CPU and memory. Standard instances may be suitable for common computing applications. Standard instances may be made available in various sizes in some embodiments. For example, "small", "medium", "large", and "extra large" instances may be made available, with each of these instances having greater amounts of CPU and memory, while maintaining approximately similar ratios of CPU to memory.

Micro instances are instances 104 that provide a small amount of consistent CPU resources and allow CPU capacity to be increased in short bursts when additional cycles are available. Micro instances may be suited for lower throughput applications and Web sites that require additional compute cycles periodically.

High memory instances are instances 104 that have proportionally more random access memory ("RAM") resources than CPU resources. High memory resources are suitable for high throughput applications, including database and memory caching applications. For example, various types of high memory instances might offer between 17.1 and 68.4 GB of RAM in embodiments disclosed herein. Larger main memory sizes might also be made available to customers of the distributed computing environment 102. In contrast, high CPU virtual machine instances 104 have proportionally more CPU resources than RAM memory resources and are well suited for compute-intensive applications.

Cluster compute instances are instances 104 that offer proportionally high CPU resources with increased network performance. Cluster compute instances are well suited for High Performance Compute ("HPC") applications and other demanding network-bound applications. Cluster GPU instances are virtual machine instances 104 that provide general-purpose GPUs with proportionally high CPU and increased network performance for applications benefitting from highly parallelized processing, including HPC, rendering and media processing applications. While cluster compute instances provide the ability to create clusters of instances connected by a low latency, high throughput network, cluster GPU instances provide an additional option for applications that can benefit from the efficiency gains of the parallel computing power of GPUs over what can be achieved with traditional processors.

High I/O instances are instances 104 that provide very high disk I/O performance and are ideally suited for many high performance database workloads. High I/O instances may utilize solid state-drive ("SSD")-based local instance storage for high I/O throughput. High I/O instances might also provide high levels of CPU, memory, and network performance.

It should be appreciated that the various instance types described above are merely illustrative. Other instance types not described herein might be utilized with the various concepts and technologies described herein. Additionally, in some embodiments, virtual machine instances may be made available in various sizes having continuous ratios of CPU to memory.

It should also be appreciated that the various instance types described above might be utilized with various operating systems. For example, a customer of the distributed computing environment 102 might request to execute a high CPU virtual machine instance executing the LINUX operating system. Similarly, a customer or other user of the of the distributed computing environment 102 might request to use a cluster compute instance executing the MICROSOFT WINDOWS SERVER operating system. Other operating systems might also be utilized.

As also shown in FIG. 4, the various instance types described above, and the other instance types described herein, might be priced according to various instance purchasing models 404. For instance, in the example shown in FIG. 4, computing resources may be priced according to an on-demand model 406, a reserved model 408, a spot model 410, or a standby model 412. Aspects of each of these purchasing models are described in greater detail below.

Computing resources priced according to the on-demand model 406, which may be referred to herein as "regular" instances, are instances 104 that are paid for and in active use by a customer 108. The on-demand model 406 allows customers 108 of the distributed computing environment 102 to pay for capacity per unit of time, such as an instance-hour, without requiring a long-term commitment. This may free the customer 108 from the costs and complexities of planning, purchasing, and maintaining hardware and transforms what are commonly large fixed costs into much smaller variable costs.

Computing resources priced according to the reserved model 408, which might be referred to herein as "reserved instances", are instances 104 that are reserved for a customer in exchange for a payment. The reserved model 408 provides a customer 108 the option to make a one-time payment for each instance they want to reserve. In turn, the customer 108 may receive a significant discount on the hourly usage charge for reserved instances as compared to on-demand instances. After the customer 108 makes a one-time payment for reserved instances, the reserved instances are reserved for the customer and the customer has no further obligation. The customer 108 may choose to run the reserved instances 104 for the discounted usage rate for the duration of a chosen term. If the customer 108 does not use the reserved instances, the customer 108 will not pay usage charges on these instances.

The spot model 410 allows customers 108 to bid on unused capacity in the distributed computing environment 102. The customer 108 can run the instances 104 priced according to the spot model 410s, which may be referred to herein as "spot instances", for as long as their bid exceeds a current market price, called the spot instance market price. The spot instance market price may fluctuate based upon the supply of instances and the customer demand for the instances. Spot instances may be terminated if a customer's maximum bid no longer exceeds the current spot instance market price.

In order to obtain spot instances, a customer 108 places a request for spot instances that specifies the desired number of spot instances and the maximum price the customer is willing to pay per instance hour. If the customer's maximum price bid exceeds the current spot instance market price for the spot instances, the customer's request will be fulfilled and the customer's spot instances will run until either the customer chooses to terminate them or the market price increases above the customer's maximum price (whichever is sooner). Various components operating within the distributed computing environment 102 may manage the market for the spot instances, including setting the current spot instance market price for the spot instances.

Computing resources purchased according to the standby model 412, which might be referred to as "standby instances", are spot instances that have been acquired on behalf of a customer 108 and that are made ready for near immediate use by the customer in the manner described herein. The price charged for standby instances is typically less than the price charged for on-demand instances, since the standby instances may be terminated in the same manner as spot instances. In one embodiment, standby instances are priced higher than spot instances and reserved instances, but lower than on-demand instances.

It should be appreciated that the various instance purchasing models 404 described above for on-demand instances, reserved instances, spot instances, and standby instances are merely illustrative and that other mechanisms may be utilized to set the pricing for the various instance types. It should also be appreciated that the embodiments disclosed herein may be utilized with any of the instance types and purchasing models 404 shown in FIG. 4 and other configurations of instances and purchasing models 404 not shown in FIG. 4. Additionally, it should be appreciated that other types of computing resources might also be priced according to the instance purchasing models 404 shown in FIG. 4 or others.

As discussed above, the embodiments disclosed herein might also be utilized with other types of computing resources, such as data storage resources, database resources, networking resources, and others. These resources might also be available in various configurations, capacities, arrangements, and priced according to various pricing schemes.

Figure 5:
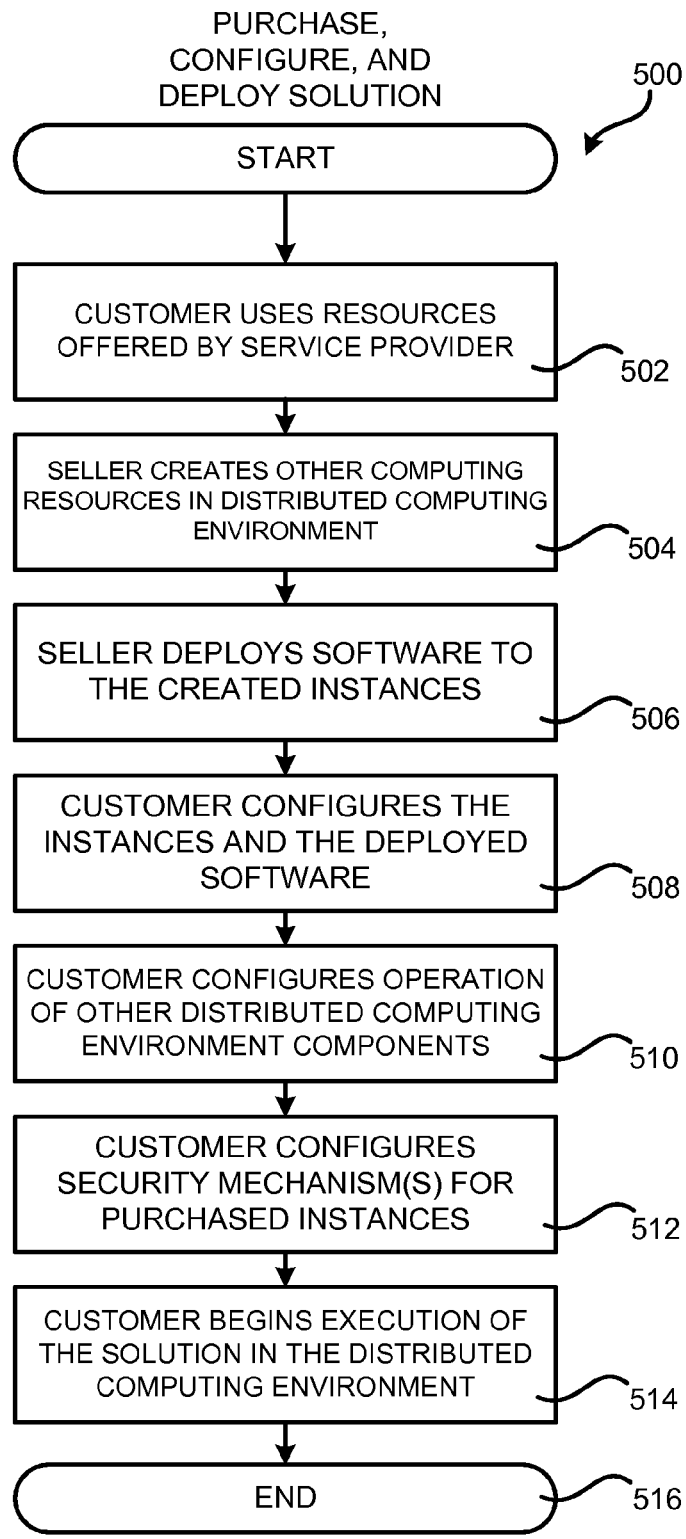
FIG. 5 is a flow diagram showing one illustrative routine that describes aspects of the operation of a process for purchasing, creating, and deploying a solution that utilizes instances of computing resources provided by a distributed computing environment, according to one embodiment disclosed herein.

FIG. 5 is a flow diagram showing one illustrative routine 500 that describes aspects of the operation of one process for purchasing, creating, and deploying a solution 112 that utilizes computing resources provided by the distributed computing environment 102, according to one embodiment disclosed herein. It should be appreciated that the logical operations described herein with respect to FIG. 5 and the other figures are implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 500 begins at operation 502, where the customer 108A uses computing resources offered by a service provider. For example, the customer 108A could upload a machine image and register it with the distributed computing environment 102 or create a virtual machine using a machine image offered by the service provider. At the time the customer 108A starts using computing resources offered by the service provider, the billing component 116 associates payment responsibility 128 for the used resources with the customer 108A. In addition, the distributed computing environment 102 can generate logs indicating that the user account for the seller 108A used computing resources offered by the service provider. For example, a first log can be generated that indicates that the user account uploaded a machine image and a second log can indicate the user account created a virtual machine from the machine image.

From operation 502, the routine 500 proceeds to operation 504, where the customer 108A creates and uses other computing resources 105 offered by the service provider of the distributed computing environment 102. For instance, and as discussed above, the customer 108A might store data in a data storage service or a database service. The customer 108A may also configure networking resources such as load balancers to balance the load across multiple virtual machine instances or use other types of resources offered for purchase and use by the service provider. As in the case of the virtual machine instances 104, the billing component 116 associates payment responsibility 128 for the other computing resources 105 with the customer 108A. In this way, the billing component 116 might cause the customer 108A to be charged every month or other unit of time for use of the virtual machine instances 104 and the other computing resources 105.

From operation 504, the routine 500 proceeds to operation 506, where the customer 108A might deploy software to the newly created instances. For example, the customer 108A might deploy application software to the virtual machine instances 104 for providing a solution 112, such as a website or a web-based game. The routine 500 then proceeds to operation 508, where the customer 108A configures the deployed software. The customer 108A might also configure aspects of the operation of the instances and/or other computing resources 105 in the solution 112 for executing the software.

From operation 508, the routine 500 proceeds to operation 510 where the customer 108A might configure the operation of other components. For instance, and as described above, the customer 108A might configure an auto scaling service to automatically add new virtual machine instances 104 to the solution 112 in response to fluctuations in demand. Other types of services offered by the service provider for providing the solution 112 might also be configured at operation 510.

From operation 510, the routine 500 proceeds to operation 512, where the customer 108A configures the various security components 114 for the instances 104 and/or other computing resources 105 that make up the solution 112. For example, and as described briefly above, the customer 108A might define one or more security groups on the resources of the solution 112. The customer 108A might also define one or more access control policies for the resource of the solution 112. Similarly, the customer 108A might define or be provided with a public/private key pair utilized to access the resources. It should be appreciated that some or all of these security mechanisms might be implemented in an automated fashion by the security components 114 executing in the distributed computing environment 102. It should also be appreciated that other security mechanisms might also be implemented that provide the customer 108A exclusive control over the instances 104 and/or other computing resources 105 in the solution 112.

From operation 512, the routine 500 proceeds to operation 514, where the customer 108A deploys the solution 112. As mentioned above, the resources of the solution 112 might be used in production to serve actual customer requests. In other cases, the resources of the solution 112 might be deployed but may not actually be made available to end users to serve customer requests. In this case, it may be up to a purchaser of the solution 112 to enable the solution 112 to serve actual customer requests or to perform other types of processing. From operation 514, the routine 500 proceeds to operation 516, where it ends.

Figure 6:
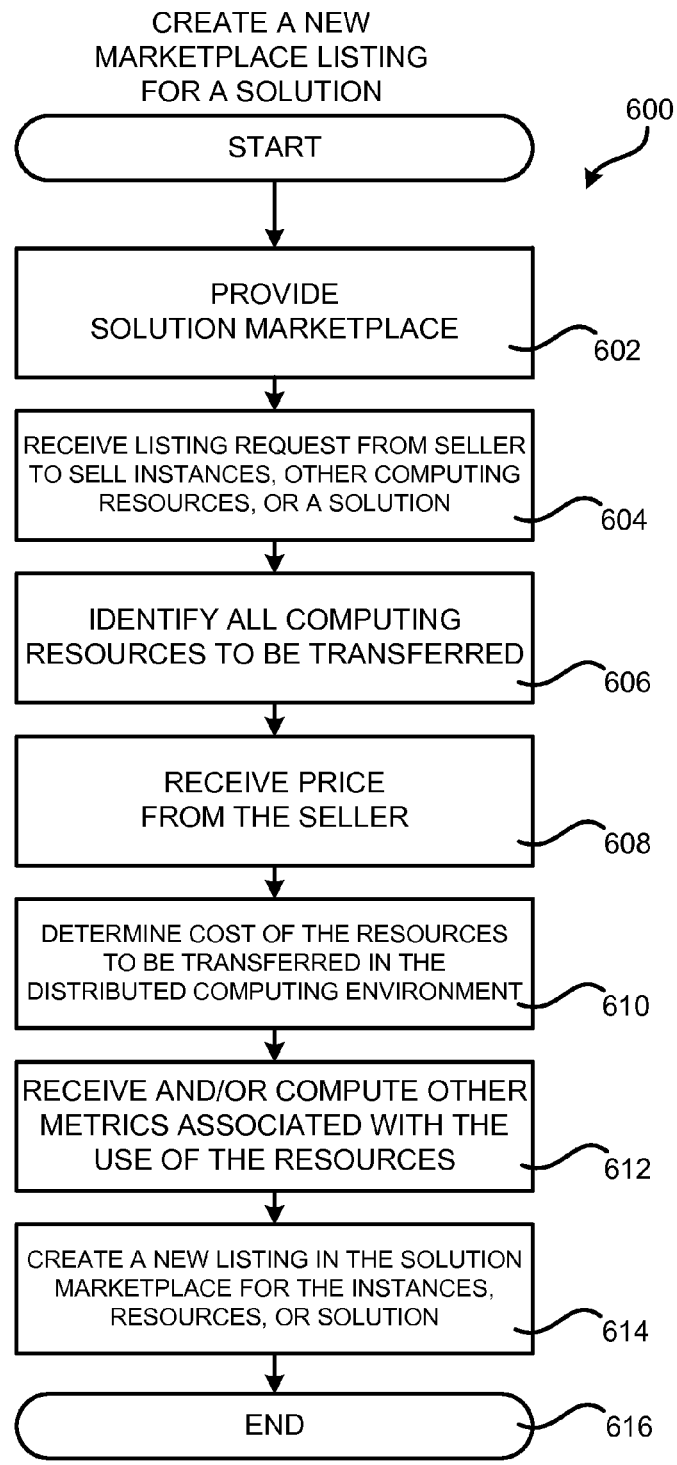
FIG. 6 is a flow diagram showing one illustrative routine that describes aspects of one mechanism disclosed herein for providing a solution marketplace and creating a new marketplace listing for selling a solution that utilizes computing resources provided by a distributed computing environment, according to one embodiment disclosed herein.

FIG. 6 is a flow diagram showing one illustrative routine 600 that shows aspects of one mechanism disclosed herein for providing a solution marketplace 120 and creating a new marketplace listing 126 for selling a solution 112 that utilizes computing resources in a distributed computing environment 102 provided by a service provider, according to one embodiment disclosed herein. The routine 600 begins at operation 602, where the marketplace component 118 provides the solution marketplace 120 in the manner described above. For example, the marketplace component 118 can include a web server that hosts a web-based marketplace.

From operation 602, the routine 600 then proceeds to operation 604, where a listing request 125 is received from a customer 108A to sell a solution 112 by way of the solution marketplace 120. For example, the customer 108A may submit a listing request 125 to the marketplace component 118 containing information identifying the solution 112 and/or the instances 104 or other computing resources 105 to be sold, such as that described above. In a specific example embodiment, the customer 108A can log into a web-console generated by the marketplace component 118 and select the resources he or she would like to list on the solution marketplace 120.

In an embodiment, the customer 108A can manually search through all the resources associated with his or her account to determine which resources to list, or the customer could search his or her resources for tags the customer previously associated with the resources. In another embodiment, the customer 108A can submit a query to the resource identification module 119 via the console to detect resources, and the resource identification module 119 can find resources that may be associated with the solution 112. The customer 108A can then check all of the resources he or she wants to list. The routine 600 then proceeds from operation 604 to operation 606.

At optional operation 606, the resource identification module 119, or another component executing within or external to the distributed computing environment 102, identifies the computing resources utilized by or associated with the instances 104 and/or the solution 112 to be transferred. As discussed briefly above, the customer 108A might be required to explicitly identify all of the instances 104 and/or other computing resources 105 to be sold, such as all of the computing resources associated with a solution 112. In other implementations, the resource identification module 119 might identify associated resources.

As mentioned briefly above, the customer 108A might be permitted to sell a single instance 104 or multiple instances that are not part of a solution 112. For example, the customer 108 may request to sell a single virtual machine instance 104. In response thereto, the resource identification module 119 can execute the identification process described above to ensure that operation of the solution 112 does not depend on necessary resources that will not be available after the transfer. If additional computing resources are identified, the customer 108A might be requested to offer the additional instances for sale together with the identified virtual machine instance 104, or instances.

In one implementation, the resources identification module 119 is configured to generate a confidence score. In particular, for a given seed resource, the module 119 can compute a confidence score indicating how likely it is that two computing resources are related. The confidence score might then be presented to the customer 108A. In order to compute the confidence score, the resource identification module 119 might examine one or more computing resources owned by the customer 108A, and utilize information in logs and/or tags to establish that the computing resources are related. For example, the module 119 could relate an instance 104 to a load balancer by looking at logs that indicate that the load balancer is routinely used to route traffic to the instance 104. Once confident that the load balancer is part of a solution 112 that includes the instance 104, the module 119 might group other instances 104 that connect to the load balancer and determine they are part of the solution 112. Other mechanisms might also be utilized in other embodiments to identify related computing resources that should be sold together.

At operation 608 of the routine 600, the marketplace component 118 receives a price for the solution 112 or individual instances 104 or other computing resources to be sold. As discussed briefly above, the sale price might be included in a listing request 125 submitted to the marketplace component 118 in one implementation. From operation 608, the routine 600 proceeds to operation 610, where the marketplace component 118 determines the cost to execute the solution 112 in the distributed computing environment 102. For example, the marketplace component 118 might communicate with the billing component 116 to determine a cost for executing the solution 112 in the distributed computing environment 102 per day, week, month, or other time period. This information might be exposed to potential purchasers of the solution 112 in the listing 126 in the solution marketplace 120.

From operation 610, the routine 600 proceeds to operation 612 where the marketplace component 118 receives and/or computes other metrics associated with the execution of the solution 112. For example, a listing request 125 submitted by a customer 108 for a solution 112 might indicate the number of requests received and/or processed by a solution 112 offered for sale, metrics describing the reliability of the solution 112, and/or other information related to the actual operation of the solution 112 within the distributed computing environment 102. The routine then proceeds from operation 612 to operation 614.

At operation 614, the marketplace component creates a new listing 126 for the solution 112 in the solution marketplace 120. The listing 126 might include the information provided by the customer 108A, such as a description of the solution 112 or instances 104 offered for sale, a description of the instances 104 and/or other computing resources included in the solution 112, information regarding the cost to operate the solution 112 or instances 104, data regarding the number of requests received and/or served by the solution 112 or instances 104, other metrics relating to the execution of the solution 112 of instances 104 offered for sale, and potentially other information. The marketplace component 118 also makes the solution marketplace 120, including the new listing 126, available for viewing by customers of the distributed computing environment 102, such as the customer 108B. The routine 600 then proceeds from operation 614 to operation 616, where it ends.

Figure 7:
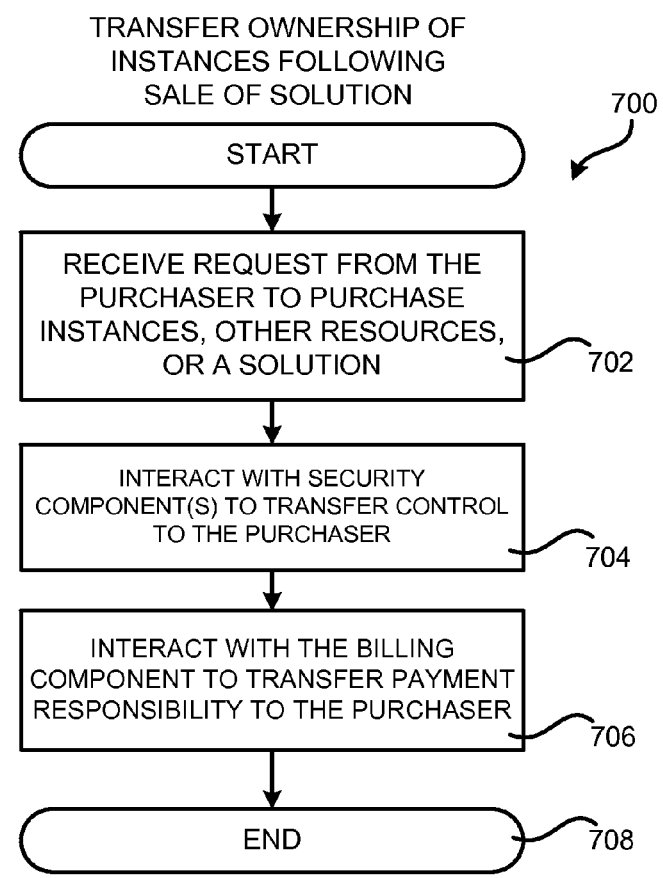
FIG. 7 is a flow diagram showing one illustrative routine that describes aspects of one mechanism disclosed herein for transferring control and payment responsibility for computing resources provided by a distributed computing environment, according to one embodiment disclosed herein.

FIG. 7 is a flow diagram showing one illustrative routine 700 that shows aspects of one mechanism disclosed herein for transferring ownership of computing resources provided by the distributed computing environment 102, according to one embodiment disclosed herein. The routine 700 begins at operation 702, where the marketplace component 118 receives a request from a customer 108B to purchase a solution 112 listed in the solution marketplace 120. In other implementations, the marketplace component 118 might receive a request from a customer 108B to purchase a single instance 104 and/or other computing resources 105 that are not a part of a solution 112 that have been listed in the solution marketplace 120.

In response to receiving a purchase request, the routine 700 proceeds from operation 702 to operation 704, where the marketplace component 118 interacts with the security components 114 to transfer control 130 of the identified instances 104 and/or other computing resources 105 to the purchaser 108B. For example, and as described above, security groups, access control policies, and other types of security mechanisms might be modified to transfer control 130 of the instances 104 and/or other computing resources 105 from the customer 108A to the customer 108B. The marketplace component 118 might also interact with other types of security components 114 to perform other changes in order to transfer control 130 of the purchased instances 104 and/or other computing resources 105 to the customer 108B.

From operation 706, the routine 700 proceeds to operation 708, where the marketplace component 118 interacts with the billing component 116 to transfer payment responsibility 128 for the transferred computing resources to the customer 108B. As described briefly above, the marketplace component 118 might instruct the billing component 116 to modify its records to indicate that the purchaser 108B, rather than the seller 108A is responsible for charges associated with the transferred computing resources. Following such a modification, the customer 108B will assume responsibility for the payment of charges associated with the transferred computing resources. Other operations might also be performed in order to transfer control 130 and payment responsibility 128 from a customer 108A to a customer 108B of the distributed computing environment 102. From operation 708, the routine 700 proceeds to operation 710, where it ends.

Figure 8:
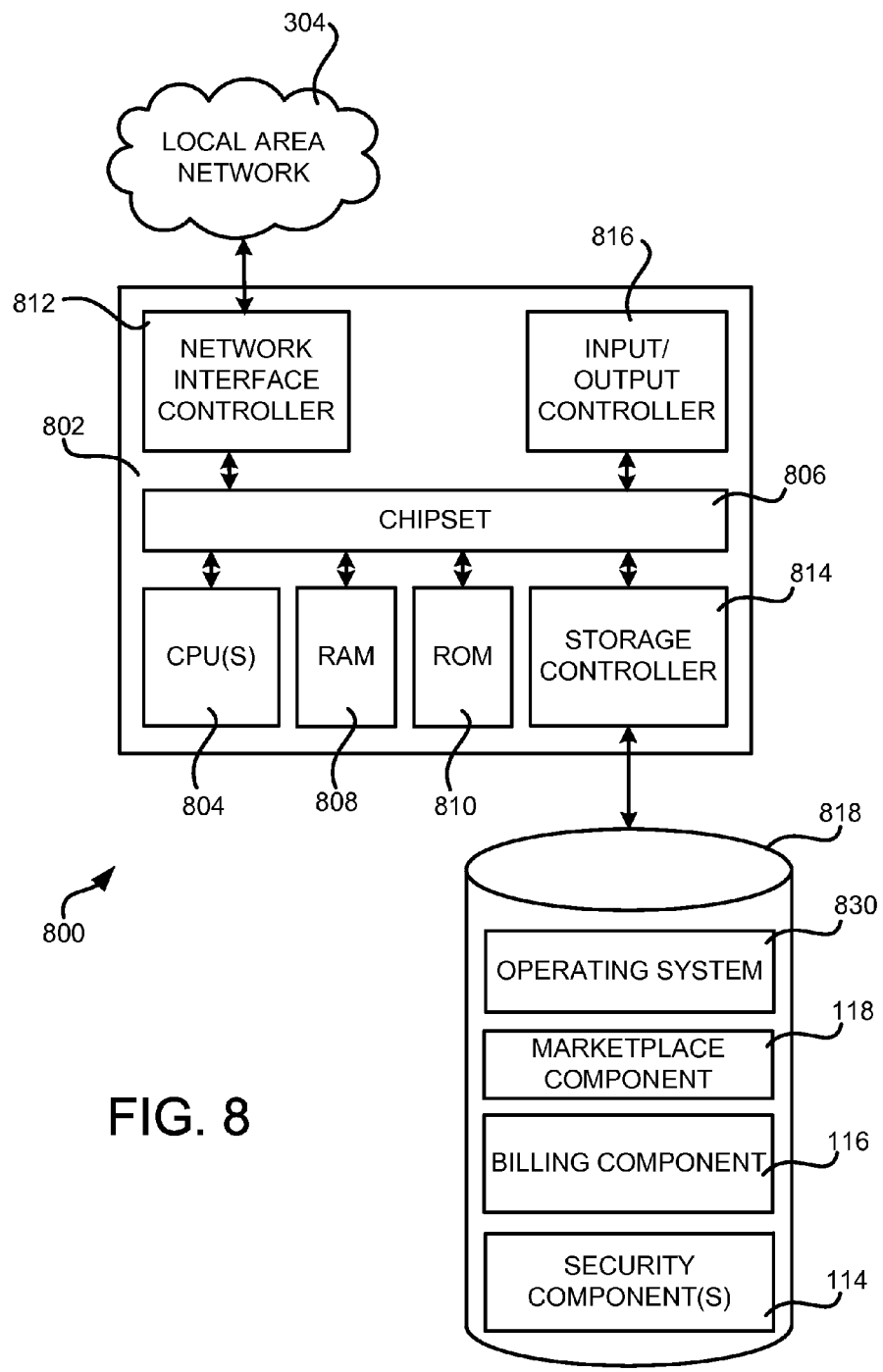
FIG. 8 is a computer architecture diagram showing one illustrative computer hardware architecture for implementing a computing device that might be utilized to implement aspects of the various embodiments presented herein.

FIG. 8 shows an example computer architecture for a computer 800 capable of executing the program components described above for transferring ownership of computing resources provided as a service by a distributed computing environment 102. The computer architecture shown in FIG. 8 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein described as executing within the data centers 204A-204N, on the server computers 302A-302F, or on any other computing system mentioned herein.

The computer 800 includes a baseboard 802, or "motherboard," which is a printed circuit board to which a multitude of components or devices may be connected by way of a system bus or other electrical communication paths. In one illustrative embodiment, one or more central processing units ("CPUs") 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a random access memory ("RAM") 808, used as the main memory in the computer 800. The chipset 806 may further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM may also store other software components necessary for the operation of the computer 800 in accordance with the embodiments described herein.

The computer 800 may operate in a networked environment using logical connections to remote computing devices and computer systems through a network, such as the local area network 304. The chipset 806 may include functionality for providing network connectivity through a NIC 812, such as a gigabit Ethernet adapter. The NIC 812 is capable of connecting the computer 800 to other computing devices over the network 304. It should be appreciated that multiple NICs 812 may be present in the computer 800, connecting the computer to other types of networks and remote computer systems.

The computer 800 may be connected to a mass storage device 818 that provides non-volatile storage for the computer. The mass storage device 818 may store system programs, application programs, other program modules, and data, which have been described in greater detail herein. The mass storage device 818 may be connected to the computer 800 through a storage controller 814 connected to the chipset 806. The mass storage device 818 may consist of one or more physical storage units. The storage controller 814 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 may store data on the mass storage device 818 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 818 is characterized as primary or secondary storage, and the like.

For example, the computer 800 may store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 818 by detecting the physical states or characteristics of one or more particular locations within the physical storage units.

In addition to the mass storage device 818 described above, the computer 800 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 800.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 818 may store an operating system 830 utilized to control the operation of the computer 800. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 818 may store other system or application programs and data utilized by the computer 800, such as the marketplace component 118, the billing component 116, the security components 114, and/or any the other software components and data described above. The mass storage device 818 might also store other programs and data not specifically identified herein.

In one embodiment, the mass storage device 818 or other computer-readable storage media is encoded with computer-executable instructions which, when loaded into the computer 800, transforms the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various routines described above with regard to FIGS. 5, 6, and 7.

The computer 800 may also include one or more input/output controllers 816 for receiving and processing input from a number of input devices, such as a keyboard, a mouse, a touchpad, a touch screen, an electronic stylus, or other type of input device. Similarly, the input/output controller 816 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for transferring ownership of computing resources in a distributed computing environment 102 have been presented herein. Although the disclosure presented herein has been primarily made with reference to virtual machine instances, it should be appreciated that the embodiments disclosed herein might also be utilized to transfer ownership of instances of other types of computing resources. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A system for transferring ownership of instances of computing resources in a distributed computing environment, the system comprising:
   one or more computer systems configured to provide an environment for implementing a solution comprising one or more virtual machine instances; and
   one or more computing devices configured to
      receive a request to transfer the solution from a first customer of the environment to a second customer of the environment, and
      in response to receiving the request to transfer the solution,
         monitor, by the one or more computing devices, execution of the virtual machine instances,
         identify one or more other computing resources associated with the solution by a resource identification module executing on the one or more computing devices based on the monitoring of the execution of the virtual machine instances,
         transfer control of the virtual machine instances and the one or more other computing resources from the first customer to the second customer, and
         transfer payment responsibility for the solution from the first customer to the second customer.

2. The system of claim 1, wherein the request to transfer the solution is received following a sale of the solution from the first customer to the second customer by way of a solution marketplace.

3. The system of claim 1, wherein the one or more other computing resources associated with the solution are further identified by calling one or more application programming interfaces exposed in the environment for identifying computing resources associated with a solution.

4. The system of claim 1, wherein transferring the control of the virtual machine instances and the one or more other computing resources from the first customer to the second customer comprises modifying one or more security groups to permit the second customer to control the virtual machine instances and the one or more other computing resources.

5. The system of claim 1, wherein transferring the control of the virtual machine instances and the one or more other computing resources from the first customer to the second customer comprises modifying one or more access control policies to permit the second customer to control the virtual machine instances and the one or more other computing resources.

6. The system of claim 1, wherein the one or more other computing resources comprise one or more of data storage resources, database resources, or networking resources.

7. A non-transitory computer-readable storage medium having computer-executable instructions stored thereupon which, when executed by one or more computing devices, cause the one or more computing devices to:
   receive, by the one or more computing devices, a request to transfer one or more instances of computing resources provided by a service provider from a first customer of the service provider to a second customer of the service provider; and
   in response to receiving the request,
      monitor, by the one or more computing devices, execution of the one or more instances of computing resources,
      identify one or more other computing resources associated with the one or more instances of computing resources by a resource identification module executed on the one or more computing devices based on the monitoring of the execution of the one or more instances of computing resources,
      transfer, by the one or more computing devices, control of the one or more instances of computing resources and the one or more other computing resources from the first customer to the second customer, and
      transfer, by the one or more computing devices, payment responsibility for the one or more instances of computing resources from the first customer to the second customer.

8. The computer-readable storage medium of claim 7, having further computer-executable instructions stored thereupon which, when executed by the computer, cause the computer to:
   transfer payment responsibility for the one or more other computing resources from the first customer to the second customer.

9. The computer-readable storage medium of claim 8, wherein the one or more other computing resources are further identified by calling an application programming interface.

10. The computer-readable storage medium of claim 9, wherein control of the instances of computing resources and the one or more other computing resources is transferred from the first customer to the second customer by modifying one or more security groups, by modifying one or more access control policies, or by providing a public/private key pair to the second customer for accessing the instances of computing resources and the one or more other computing resources.

11. The computer-readable storage medium of claim 10, wherein the instances of computing resources comprise virtual machine instances and wherein the one or more other computing resources comprise data storage resources, database resources, or networking resources.

12. A computer-implemented method for transferring computing resources, the method comprising:
   receiving, by one or more computing devices, a request to transfer one or more instances of computing resources provided by a service provider from a first customer of the service provider to a second customer of the service provider; and
   in response to receiving the request,
      monitoring, by the one or more computing devices, execution of the one or more instances of computing resources,
      identifying one or more other computing resources associated with the one or more instances of computing resources by a resource identification module executed on the one or more computing devices based on the monitoring of the execution of the one or more instances of computing resources,
      transferring, by the one or more computing devices, control of the one or more instances of computing resources and the one or more other computing resources from the first customer to the second customer, and
      transferring, by the one or more computing devices, payment responsibility for the one or more instances of computing resources from the first customer to the second customer.

13. The computer-implemented method of claim 12, wherein the request to transfer the one or more instances of computing resources is received following a sale of the one or more instances of computing resources from the first customer to the second customer by way of a solution marketplace.

14. The computer-implemented method of claim 12, further comprising:
transferring payment responsibility for the one or more other computing resources from the first customer to the second customer.

15. The computer-implemented method of claim 14, wherein the one or more other computing resources are further identified by calling an application programming interface.

16. The computer-implemented method of claim 14, wherein the one or more other computing resources comprise one or more of data storage resources, database resources, or networking resources.

17. The computer-implemented method of claim 12, wherein transferring control of the one or more instances of computing resources from the first customer to the second customer comprises modifying one or more security groups to permit the second customer to control the one or more instances of computing resources.

18. The computer-implemented method of claim 12, wherein transferring control of the one or more instances of computing resources from the first customer to the second customer comprises modifying one or more access control policies to permit the second customer to control the one or more instances of computing resources.

19. The computer-implemented method of claim 12, wherein transferring control of the one or more instances of computing resources from the first customer to the second customer comprises providing a credential to the second customer for accessing the one or more instances of computing resources.

20. The non-transitory computer-readable storage medium of claim 19, wherein the request to transfer the one or more instances of computing resources is received following a sale of the one or more instances of computing resources from the first customer to the second customer by way of a solution marketplace.

* * * * *